H. L. BLYDENBURGH.
TRANSMISSION GEARING.
APPLICATION FILED APR. 7, 1916.

1,250,546.

Patented Dec. 18, 1917.

Witness
Emmus B Wiener.

Inventor
HAROLD L. BLYDENBURGH.

By Charles E. Wiener,
Attorney

UNITED STATES PATENT OFFICE.

HAROLD L. BLYDENBURGH, OF DETROIT, MICHIGAN.

TRANSMISSION-GEARING.

1,250,546.  Specification of Letters Patent.  Patented Dec. 18, 1917.

Application filed April 7, 1916. Serial No. 89,539.

*To all whom it may concern:*

Be it known that I, HAROLD L. BLYDENBURGH, a citizen of the United States, residing at Detroit, county of Wayne, State of Michigan, have invented a certain new and useful Improvement in Transmission-Gearing, and declare the following to be a full, clear, and exact description of the same, such as will enable others skilled in the art to which it pertains to make and use the same, reference being had to the accompanying drawings, which form a part of this specification.

This invention relates to transmission gearing adaptable for use in transmitting the power of a prime mover to a driven element at various speeds. The device is particularly useful in automobile construction in which several forward speeds may be secured when desired, and means is employed to reverse the direction of rotation of the driven element at will. An object of the invention is a transmission gearing in which several forward speeds may be secured without necessity of shifting the gears and a further object of the invention is a transmission gearing of the character stated in which all of the gears are continuously in mesh and in which any predetermined gear may be fixed to rotate with the driving shaft to operate the driven shaft at the desired speed.

As is usual in devices of this character, a driving shaft is employed having gears thereon and a counter shaft provided with companion gears through which the various speeds, less than what is known as "high speed," may be attained. An object of this invention is a transmission gearing having a main driving shaft with the change-speed gears running loosely thereon, means for securing any one of the gears in fixed relation with the driving shaft, and a series of gears on the counter-shaft in fixed relation one to the other, and operating simultaneously, and an additional object of the invention is involved in the mechanism by means of which the counter shaft may transmit power to the driven shaft at all speeds less than what is known as high speed or direct drive, and that automatically releases the counter shaft from operation upon shifting to "high speed" or directly connecting the driving and driven shafts. These and other objects and the several novel features of construction of the invention are hereinafter more fully described and claimed and shown in the accompanying drawings in which—

Similar characters refer to similar parts throughout the drawing and specification.

Figure 1:
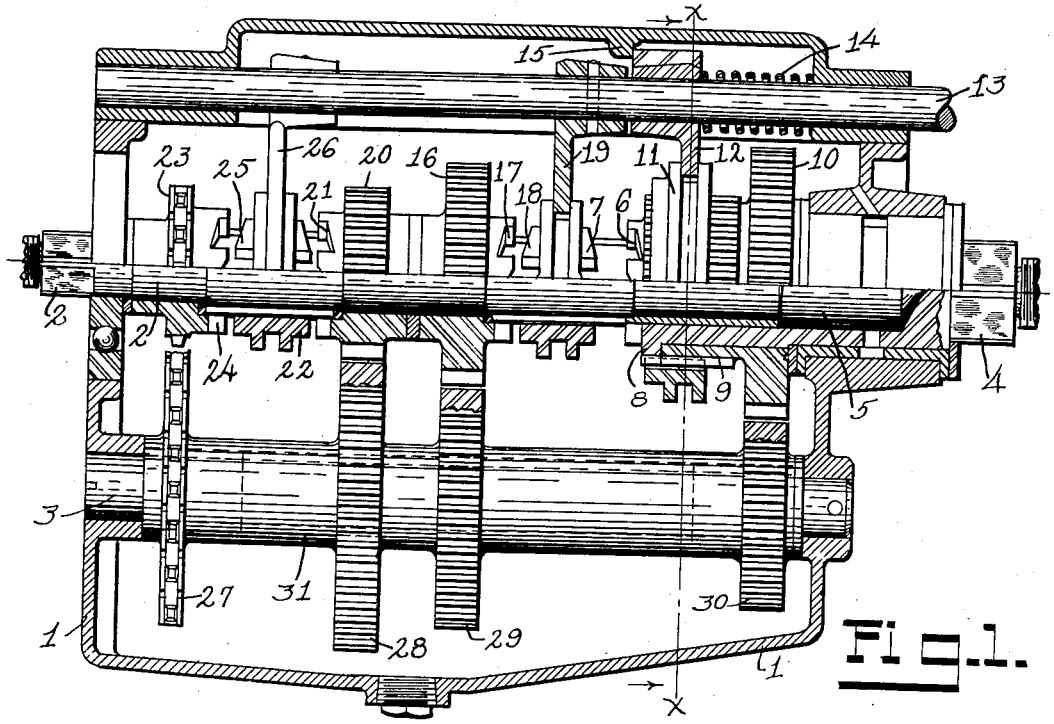
Figure 1 is a side view partly in section and partly in elevation of a transmission gearing embodying my invention.
Figure 2:
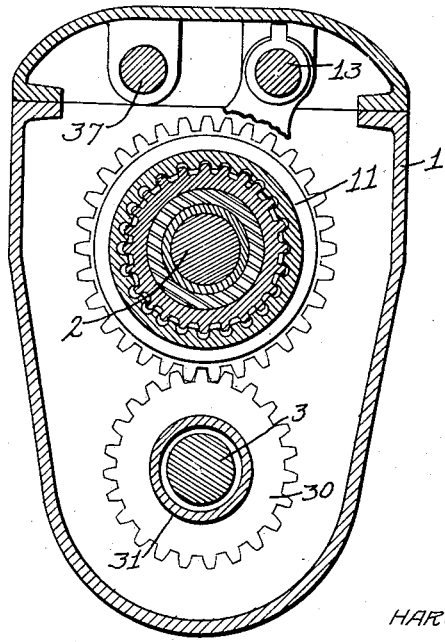
Fig. 2 is a cross-section thereof taken on line *x*—*x* of Fig. 1.

As is usual with devices of this character, a casing 1 is provided in bearings in which are mounted the driving shaft 2 and the counter shaft 3. A driven shaft 4 adapted for connection with any device that it is desired to drive, as for instance the propeller shaft of an automobile, extends into the casing and is provided with a hollow interior 5 into which the end of the driving shaft 2 extends as may be understood from Fig. 1. This drive shaft 4 terminates in the casing with a clutch member 6 formed in the end thereof adapted to be engaged by a companion clutch member 7 splined to the shaft 2. The shafts 2 and 4 are relatively revoluble. The shaft 4 near the terminal end within the casing is also provided with a circumferentially toothed gear-like flange 8. On this shaft 4 and within the casing between the flange portion 8 and the bearing for the shaft 4 is a toothed member 9 having teeth of the same shape and number as the teeth on the portion 8 of the shaft 4. This member 9 is preferably formed integrally with a gear 10 also revoluble on the shaft 4. A clutch member 11 has internal teeth corresponding to and fitting in the toothed portions 8 and 9, and is movable longitudinally on the said portion 9 to engage both portions 8 and 9 as shown in Fig. 1, or movable (to the right of the drawing Fig. 1) entirely out of engagement with the teeth on the member 8. A forked arm 12 for the clutch 11 is provided loosely mounted on the throw rod 13 carried in bearings in the upper part of the casing and held in normal position as shown in Fig. 1, by the spring 14. A stop 15 is provided in the casing limiting the extent of movement of the arm by action of the spring 14.

A second-speed gear 16 is loosely mounted on the shaft 2 having a clutch member 17 on one face thereof adapted to be engaged by the companion member 18 formed integrally with the clutch member 7, and the two clutch members 7 and 18 are simultaneously movable by means of the shifting arm 19 engaging in the groove between the two clutch members as may be understood from the drawing. The arm 19 is secured to the shifting rod 13 whereby movement of the rod shifts the clutches.

A third-speed gear 20 is also loosely mounted on the driving shaft 2 and is provided with a clutch face 21 adapted to be engaged by a companion member 22 splined to the shaft 2, and a reverse gear 23, preferably of the nature of a sprocket as hereinafter stated, is loosely mounted on the shaft 2 provided with a clutch face 24 adapted to be engaged by a companion 25 formed integrally with the clutch member 22. The two clutch members 22 and 25 are movable simultaneously by means of the shifting arm 26 secured to the throw rod 37, similar to the rod 13, in the upper part of the case. The sprocket 23 is preferably provided with a chain running on a companion sprocket 27 on the counter-shaft 3. On this counter-shaft also are the gears 28, 29 and 30. The three gears and the sprocket 27 are made to operate in unison and may either be each keyed to the shaft 3 or, as is here shown, may be secured to or formed integrally with a single hub member 31 rotatable on the shaft 3 which shaft may be fixed in the casing.

With the shifting arms 12 and 19 in the position shown in Fig. 1, the arm 26 may be shifted to bring the clutch member 25 into engagement with the clutch 24 on the reverse gear 23, thus clutching the said gear or sprocket to the shaft 2. Rotation of the shaft 2 thereupon rotates the sprocket 27 and all the gears 28, 29, and 30. The gears 16 and 21 being loose on the shaft simply rotate thereon under the condition described. The gear 30 will drive the gear 10 loosely mounted on the driven shaft and by reason of the clutch member 11 engaging the teeth of the members 8 and 9, the shaft 4 is made to rotate in reverse direction. Instead of the sprockets and chain arrangement here shown, the usual and well known reverse-gear may be utilized. Such reverse-gear is considered the equivalent of the sprocket and chain as similar results are attained thereby.

By shifting the levers 19 or 26 to engage either the gear 16 or 20, power will be transmitted to either the gear 16 or 20 through the gears 28 or 29 to drive the shaft 4 in like manner to that above described but in the same direction of rotation as the driving shaft.

When it is desired to directly connect the driven shaft 4 with the shaft 2, the rod 13 is moved to bring the clutch 7 into engagement with its companion 6 on the end of the shaft 4 within the casing. By this movement, the hub of the arm 19 on the rod 13 will first engage the hub of the shifting arm 12 and further movement of the rod 13 draws the clutch 11 out of engagement with the toothed flange 8 of the shaft 4 just prior to the engagement of the clutches 7 and 6. The shaft 4 is thus freed from connection with the gear 30 and engagement of the clutches 6 and 7 directly connects the shafts 4 and 2 so that the shaft 4 is driven at engine speed. Upon movement of the rod 13 to disengage the clutches 6 and 7, the spring 14 operates the shifting arm 12 and moves the clutch 11 to again engage the toothed flange 8 of the shaft 4. This movement of the clutch 11 connects the portion 9 and the said flange 8 so that, on power being applied to rotate the gear 30 by either the second or third speeds or reverse gear, the shaft 4 may be driven as above described.

The operating rods 13 and 37 may be controlled by any desired means as by the levers now commonly in use for such purpose in the shifting of gears (not here shown but readily understood by those familiar with the art.) By the arrangement and construction of the several parts as heretofore described, in which all of the gears are continuously in mesh, breakage of gears is reduced to a minimum, as the clashing of gears by shifting the same into and out of mesh is avoided. The device is also simple and inexpensive in construction and may be made comparatively light in weight.

Having thus described my invention, its utility, and mode of operation, what I claim and desire to secure by Letters Patent of the United States is—

1. In transmission gearing a driving shaft, a driven shaft, a counter shaft, the driven shaft terminating within the casing and being formed to receive the end of the driving shaft in axial alinement therewith, change-speed gearing by which the counter shaft may be driven at varying speeds at will by the driving shaft, a gear loosely mounted on the driven shaft, a gear on the counter shaft continually in mesh therewith, an externally toothed member formed integrally with the gear on the driven shaft, the driven shaft terminating within the casing with a toothed end contiguous to and substantially of the same pitch and diameter as the said toothed member, an internally toothed ring riding on the toothed member of the gear and movable to connect or disconnect the said toothed member and similarly the toothed portion of the driven shaft, a clutch member provided at the end of the gear on the driven shaft, a companion clutch splined to the driving shaft, and means whereby movement of the companion clutch members into engagement moves the toothed ring out of engagement with the gear on the end of the driven shaft and vice-versa.

2. In transmission gearing a driving shaft, a driven shaft, a counter shaft, a plurality of forward speed gears and a reverse gear loosely mounted on the driving shaft, companion gears on the counter shaft continuously meshing with the gears on the driving shaft, the gears on the counter shaft being fixed to rotate in unison, means operable at will to set any of the gears on the driving shaft to rotate therewith, a gear loosely mounted on the driven shaft continuously in mesh with a gear on the counter shaft, a second gear rigidly connected with the loosely mounted gear on the driven shaft, a gear rigidly connected with the driven shaft of the same diameter and pitch as and riding contiguously to and in axial alinement with said gear rigidly connected with the loosely mounted gear, said gear fixed to the driven shaft having one member of a clutch connected therewith, a companion clutch member slidable on the driving shaft, a toothed ring riding on said gear fixed to and the gear loosely mounted on the driven shaft, means whereby said ring may be moved longitudinally of the gears to connect or disconnect the same, and means for moving the slidable clutch member, the movement of the toothed ring being simultaneous with the movement of the clutch member to disconnect the companion gears on engagement of the clutches and connect the gears on disengagement of the clutches.

3. In transmission gearing, a casing, a driving shaft, a driven shaft, a counter shaft, each of the shafts being supported in fixed relation by the casing, the driven shaft terminating within the casing and being formed to receive the end of the driving shaft in axial alinement therewith, a plurality of forward speed gears and a reverse gear loosely mounted on the driving shaft, companion gears on the counter shaft continuously meshing with the gears on the drive shaft, means operable at will for fixing any of the forward speed gears to rotate with the driving shaft, a gear loosely mounted on the driven shaft, a gear on the counter shaft continuously in mesh therewith, an externally toothed member formed integrally with the gear on the driven shaft, said driven shaft having a flanged end provided with teeth substantially of the same pitch as the teeth on the toothed member, an internally toothed ring fitting the toothed member of the gear and movable to connect or disconnect the said toothed member and similarly toothed portion of the driven shaft, a clutch member provided at the end of the driven shaft within the casing, a companion clutch splined to the driving shaft, means for moving the splined clutch member into and out of engagement with its companion, means for simultaneously moving the toothed ring to disconnect or connect the toothed end of the driven shaft and said toothed member, a sprocket wheel on the counter shaft rotatable with the gears thereon and a sprocket wheel loosely mounted on the driving shaft, a chain on the said sprocket wheels, and a clutch movable to connect the sprocket with the driving shaft at a time when the toothed ring is positioned to connect the toothed end of the driven shaft and said companion toothed member.

4. In transmission gearing, a casing, a driving shaft, a driven shaft, a countershaft, each of the shafts being supported in fixed relation by the casing, the driven shaft terminating within the casing and being formed to receive the end of the driving shaft in axial alinement therewith, change speed gearing by which the counter-shaft may be driven at varying speeds at will by the driving shaft, a gear loosely mounted on the driven shaft, a gear on the counter-shaft continuously in mesh therewith, an externally toothed member formed integrally with the gear on the driven shaft, the driven shaft having a flanged end provided with teeth substantially of the same pitch as the teeth on the said toothed member connected with the gear, an internally toothed ring fitting the toothed member of the gear and movable to connect or disconnect the said toothed member and similarly toothed portion of the driven shaft, a clutch member provided at the end of the driven shaft within the casing, a companion clutch member splined to the driving shaft, a shifting rod, a forked arm slidably mounted on the rod and engaging the toothed ring, a spring tending to move the forked arm to move the toothed ring to connect the toothed member on the gear and toothed portion of the driven shaft, a stop in the casing limiting movement of said forked arm by the spring, a second forked arm fixed to the shifting rod and engaging the clutch on the driving shaft, the relationship of the said arms and clutches being such that movement of the rod to bring the clutch on the driving shaft into engagement with its companion on the driven shaft moves the toothed ring out of engagement with the toothed portion of the driven shaft.

In testimony whereof I sign this specification.

HAROLD L. BLYDENBURGH.